(12) United States Patent
Heemann et al.

(10) Patent No.: US 7,575,074 B2
(45) Date of Patent: Aug. 18, 2009

(54) DRILLING HEAD FOR AN ANCHOR

(75) Inventors: Kay Heemann, Kaufering (DE);
Wolfgang Ludwig, Klosterlechfeld (DE); Roland Gienau, Wahroonga (AU); Uwe Bohn, Kissing (DE)

(73) Assignee: Hilti Aktiengesellschaft, Schaan (LI)

( * ) Notice: Subject to any disclaimer, the term of this patent is extended or adjusted under 35 U.S.C. 154(b) by 109 days.

(21) Appl. No.: 11/703,402

(22) Filed: Feb. 6, 2007

(65) Prior Publication Data

US 2007/0193785 A1    Aug. 23, 2007

(30) Foreign Application Priority Data

Feb. 20, 2006   (DE) .................. 10 2006 000 083

(51) Int. Cl.
*E21B 10/36*   (2006.01)
(52) U.S. Cl. ..................................... 175/415
(58) Field of Classification Search .......... 175/98, 175/210, 211, 230, 415, 427; 405/259.1
See application file for complete search history.

(56) References Cited

U.S. PATENT DOCUMENTS 3,144,912 A * 8/1964 Boehm et al. ............... 175/213

| 4,540,200 | A |   | 9/1985  | Larsson |
| 4,946,314 | A |   | 8/1990  | Gruber |
| 5,419,664 | A | * | 5/1995  | Hengesbach et al. ......... 411/61 |
| 6,491,478 | B2 | * | 12/2002 | Sager et al. .............. 405/259.6 |
| 7,025,538 | B2 | * | 4/2006  | Ludwig et al. ........... 405/259.5 |
| 7,059,432 | B2 | * | 6/2006  | Hauptmann et al. ......... 175/414 |
| 2002/0108789 | A1 | * | 8/2002  | Schautt .................... 175/420.1 |
| 2002/0139586 | A1 | * | 10/2002 | Webb et al. .............. 175/325.5 |
| 2005/0047874 | A1 | * | 3/2005  | Ludwig et al. ........... 405/259.1 |

FOREIGN PATENT DOCUMENTS

| DE | 3724165 A1  | 3/1988 |
| DE | 4430784 C1  | 1/1996 |
| DE | 20021835 U1 | 4/2001 |

* cited by examiner

*Primary Examiner*—David J Bagnell
*Assistant Examiner*—James G. Sayre
(74) *Attorney, Agent, or Firm*—Abelman, Frayne & Schwab

(57) ABSTRACT

A separate drilling head has a distal end which contacts the material to be drilled, and a proximal end which is attached to a drive mechanism. The drive mechanism drives the separate drilling head into the material. The separate drilling head is forcelockingly secured in a thin-walled hollow anchor tube, and the separate drilling head includes a hard metal cutter element, and a substantially axially-oriented, axial stop shoulder at the proximal end that passes into a circumferentially closed, outer cone.

7 Claims, 1 Drawing Sheet

DRILLING HEAD FOR AN ANCHOR

BACKGROUND OF THE INVENTION

1. Field of the Invention

The present invention relates to a drilling head for a self-drilling anchor and, in particular, for an injection anchor.

2. Description of the Prior Art

As is known in the prior art, drilling heads and other drilling apparatus have a distal end which contacts the material to be drilled, and a proximal end which is attached to a drive mechanism, with the drive mechanism driving the drilling head or apparatus into the material. In injection self-drilling anchors having a diameter of about 50 mm and which are mostly used in the mining industry, there is provided, on the distal end of a thin-walled anchor tube, which has an outer shaped profile and is glued to a bore wall with a reaction hard mortar, a radially projecting drilling head that is mostly equipped with hard metal cutter means. The necessary service life of the drilling head is determined by the length of the injection self drilling anchor and by the properties of a constructional component in which the anchor is to be secured. Because one-time, usable injection self-drilling anchors are needed in large quantities, their effective and material-saving manufacturing is of great importance. It is also important to minimize the annular gap between the anchor tube and a bore wall because with a thinner gap, gluing of the anchor tube with the bore wall is improved. This also results in minimization to the need in the reaction hard mortar.

German document DE 44 30 784 discloses an injection self-drilling anchor of the type described above in which the cutters on the distal end, with the cutters composed of a hard material, are directly welded to a thin-walled anchor tube having a shaped outer profile. According to German Patent DE 37 24 165 C2, an injection self-drilling anchor is provided at its distal end with a plate-shaped drilling head that is bluntly secured on a relatively thick anchor tube with a shaped outer profile. According to German Utility Model DE 20021835 U1, an injection self-drilling anchor is provided at its distal end with a drilling head having cutters of a hard material and which is bluntly secured on a relatively thick anchor tube having a shaped outer profile. A direct fixing of cutters or drilling head, using a foreign material, is technologically disadvantageous because it is not modular. In addition, use of an additional brazing or welding process, with large quantities of anchors, is noticeably more expensive.

U.S. Pat. No. 4,540,200 discloses a rock anchor a drilling head of which that is provided with hard material cutters, is secured with its inner cone part on a smooth thick-walled drill shaft. With an inner cone part radially projecting beyond the drill shaft diameter and with cutters that necessarily radially project beyond the cone part, a wider annular gap is formed between the drill shaft and a bore wall and which is unacceptable in the injection self-drilling anchors. A thin-walled drilling rod, which is guided in the inner cone part, can fail because of buckling.

U.S. Pat. No. 3,144,912 discloses a wall drill having a diameter of about 10 mm and a one-piece cross-shaped drilling head that is forcelockingly secured with a tubular drill shaft by its four outer edges extending conically outwardly. This filigree embodiment suitable for manual drilling is not suitable for substantially wider self-drilling anchors because the anchor tube undergoes a non-circular deformation due to a circumferentially pointed fixation of the drilling head, when the drilling head is pressed in the anchor tube.

Accordingly, an object of the present invention is a drilling head for a self-drilling anchor having a diameter in a range from 30 mm to 60 mm.

SUMMARY OF THE INVENTION

This and other objects of the present invention, which will become apparent hereinafter, are achieved by providing a separate drilling head for being forcelockingly secured in a thin-walled hollow anchor tube, and including hard metal cutter means and a substantially axially oriented, axial stop shoulder at the proximal end of the drilling head that passes into a circumferentially closed, outer cone.

A separate drilling head can be produced in large quantities, e.g., as a pressure die casting part and be connected with anchor rods having different diameters before being delivered to a site. With a circumferentially closed outer cone of the drilling head, a thin anchor tube, which is forcelockingly secured with the drilling head, will be circumferentially uniformly stressed, without being subjected to non-circular deformations. The drilling head itself does not project radially beyond the anchor tube up to the hard material cutters, which permits to obtain a narrow annular gap.

Advantageously, the cone angle toward a longitudinal axis amounts to from 1° to 5°.

Advantageously, the outer cone is formed as a hollow cone, which leads to material saving.

Advantageously, the outer cone is formed smooth which permits to simply and rapidly insert the drilling head in an anchor tube with a corresponding length.

Advantageously, the drilling head has a diameter of from 30 mm to 60 mm, which makes it suitable for use in conventional injection self-drilling anchors used in the mining industry.

Advantageously, the axial stop shoulder has a ring width of from 3 mm to 6 mm, which makes the drilling head suitable for use with thin-walled anchor tubes.

Advantageously, the drilling head has a cutter formed of a thin hard metal plate, which permits to achieve a material-effective service life.

Advantageously, the drilling head has a flush bore extending from the interior of the outer cone to the region of the cutters, whereby the flushing medium can flush around the cutters during drilling.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
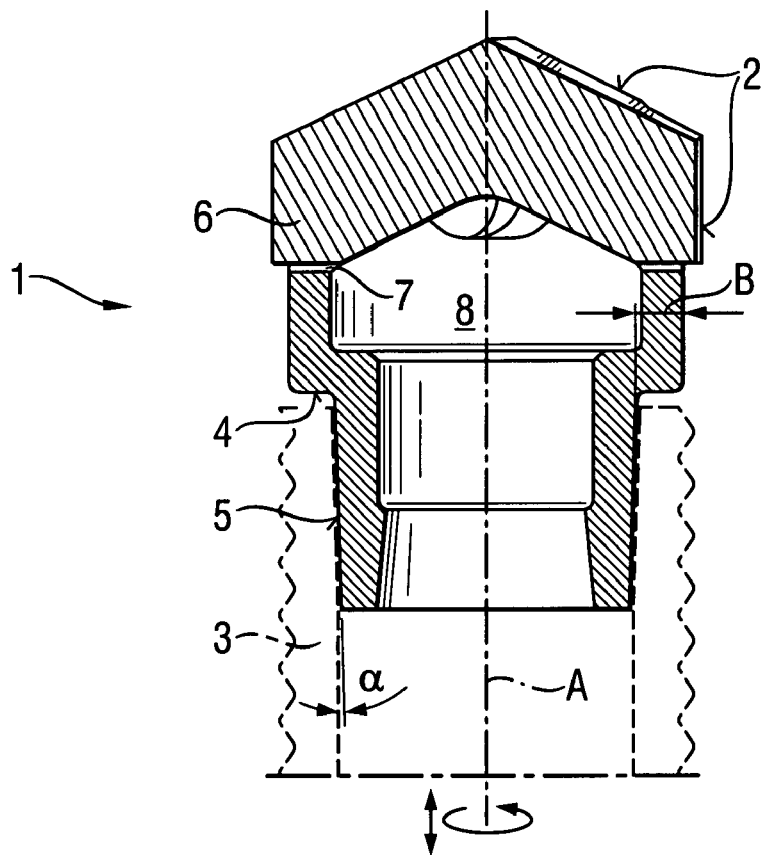
FIG. 1 a longitudinal cross-sectional view of a drilling head according to the present invention along line I-I in FIG. 2.
Figure 2:
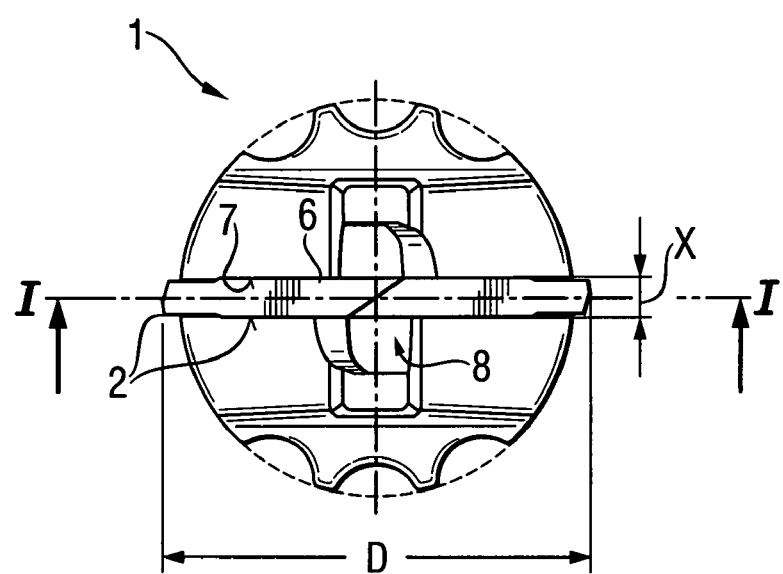
FIG. 2 a plan view of the drilling head shown in FIG. 1.

A drilling head 1 according to the present invention which is shown in FIGS. 1-2, has, at a proximal end thereof, a substantially axially oriented, axial stop shoulder 4 that passes into a circumferentially closed, hollow outer cone 5 for being forcelockingly secured in a thin-walled hollow anchor tube 3 having a shaped outer profile (shown with dash lines). The drilling head 1 has cutters 2 of a hard material. The cone angle α of the smooth outer cone 5 to a longitudinal axis A amounts to 3°. The drilling head 1 has a diameter D of 50 mm, and the axial stop shoulder 4 has a ring width B of 5 mm. The axially and radially projecting cutters 2 are formed of a 2.5 mm-thin hard metal plate 6 and are secured in corresponding slots 7 having a width X by brazing. The flushing bore 8 extends from the interior of the outer cone 5 to the region of cutters 2.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A separate drilling head (1) for being forcelockingly secured in a thin-walled hollow anchor tube (3), the drilling head (1) comprising:
    a distal end;
    a proximal end;
    a longitudinal axis (A);
    a conical member at the proximal end and forming a circumferentially closed outer cone (5);
    hard metal cutter means (2) at the distal end; and
    an axial stop shoulder (4) at the proximal end, with the axial stop shoulder (4) axially oriented to the longitudinal axis (A), and with the axial stop shoulder (4) connected to the circumferentially closed, outer cone (5), wherein the hard metal cutter means (2) comprises at least one thin hard metal plate (6), and the drilling head (1) has a slot (7) with a slot width (X) of less than 3 mm and in which the at least one hard metal plate (6) is secured.

2. A drilling head according to claim 1, wherein the outer cone (5) has:
    the longitudinal axis (A) as a conical axis of the outer cone (5); and
    a cone angle (α) measurable relative to the longitudinal axis (A);
    wherein the cone angle (α) to the longitudinal axis (A) is between 1° and 5°.

3. A drilling head according to claim 1, wherein the outer cone (5) is formed as a hollow cone.

4. A drilling head according to claim 1, wherein the outer cone (5) is formed as a smooth cone.

5. A drilling head according to claim 1, wherein the drilling head (1) has a diameter in a range of from 30 mm to 60 mm.

6. A drilling head according to claim 1, wherein the axial stop shoulder (4) has a ring width (B) in a range of from 3 mm to 6 mm.

7. A drilling head according to claim 1, comprising a flush bore (8) extending from an interior of the outer cone (5) up to a region of the cutter means (2).

* * * * *